United States Patent
Kao et al.

(10) Patent No.: US 9,840,072 B2
(45) Date of Patent: Dec. 12, 2017

(54) METHOD FOR ARRANGING JOINTS TO 3D MODEL, ARRANGING APPARATUS FOR THE METHOD, AND APPLICATION PROGRAM FOR USING THE SAME

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Tien-I Kao, New Taipei (TW); Ting-Yu Lu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 398 days.

(21) Appl. No.: 14/588,907

(22) Filed: Jan. 3, 2015

(65) Prior Publication Data

US 2016/0103934 A1   Apr. 14, 2016

(30) Foreign Application Priority Data

Oct. 9, 2014   (TW) .............................. 103135138 A

(51) Int. Cl.
*G06F 17/50* (2006.01)
*B33Y 50/00* (2015.01)

(52) U.S. Cl.
CPC ..................................... *B33Y 50/00* (2014.12)

(58) Field of Classification Search
CPC .......... B33Y 50/00; B33Y 50/02; G06F 17/50
See application file for complete search history.

(56) References Cited

U.S. PATENT DOCUMENTS

| | | | |
|---|---|---|---|
| 2007/0177784 A1* | 8/2007 | Valdiserri | G06K 9/00 382/128 |
| 2015/0016667 A1* | 1/2015 | Algreatly | G06K 9/00201 382/103 |

FOREIGN PATENT DOCUMENTS

WO   PCT/US13/49853   *  7/2013 ............. G06T 17/10

\* cited by examiner

*Primary Examiner* — Thomas Lee
*Assistant Examiner* — Vincent Chang
(74) *Attorney, Agent, or Firm* — Chun-Ming Shih; HDLS IPR Services

(57) ABSTRACT

A method for arranging joints to a 3D model is present. The method first obtains a 3D file, and executes a slice process to a 3D model recorded in the 3D file for obtaining a plurality of cross sections. During the slice process, the method determines if differences between each two cross-section areas of two adjoined cross sections is larger than a threshold. If the difference between the two cross-section areas of two adjoined cross sections is larger than the threshold, the method obtains a corresponding joint data from a database, and arranges the joint data into a position between the two adjoined cross sections. The method finally outputs the arranged 3D model to a 3D printer.

11 Claims, 9 Drawing Sheets

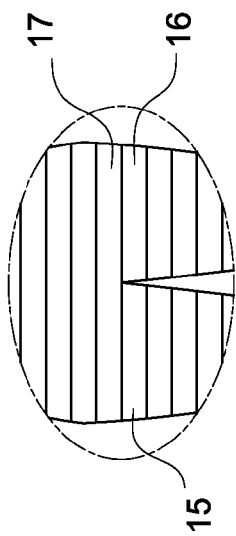
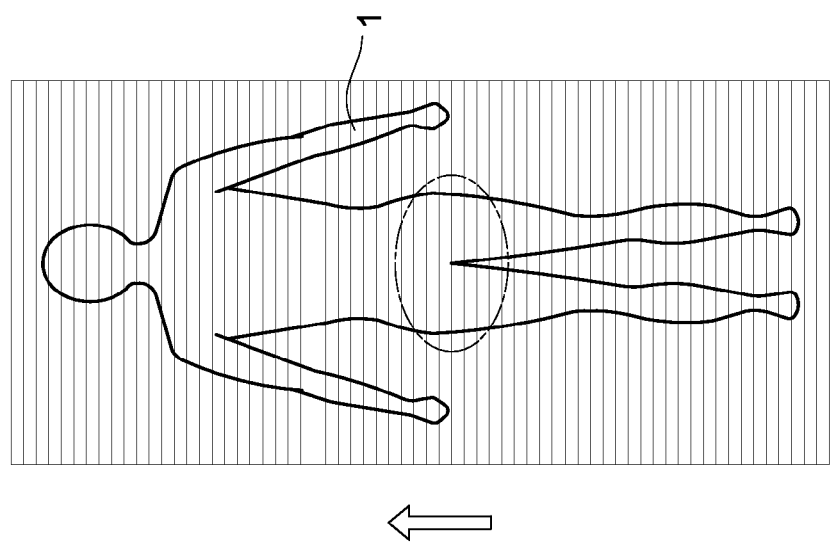
FIG.2F
FIG.2E

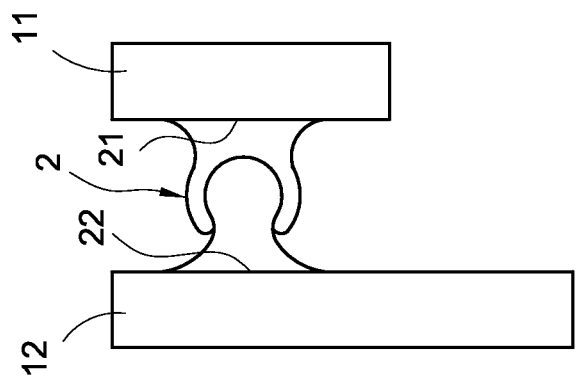
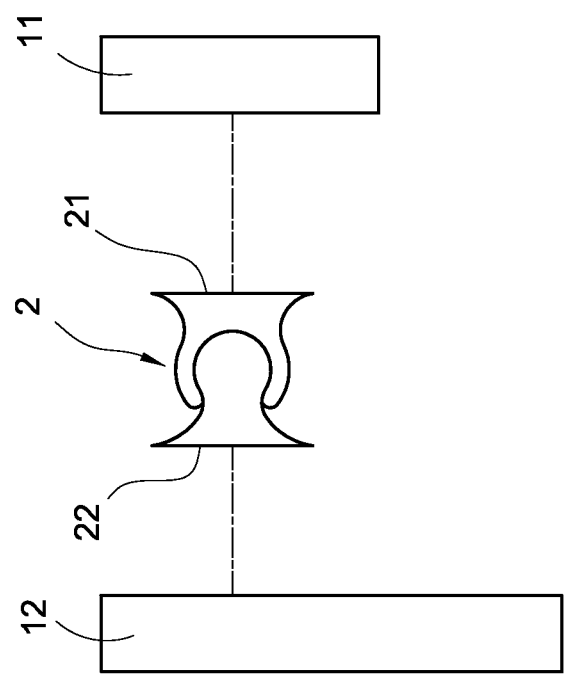

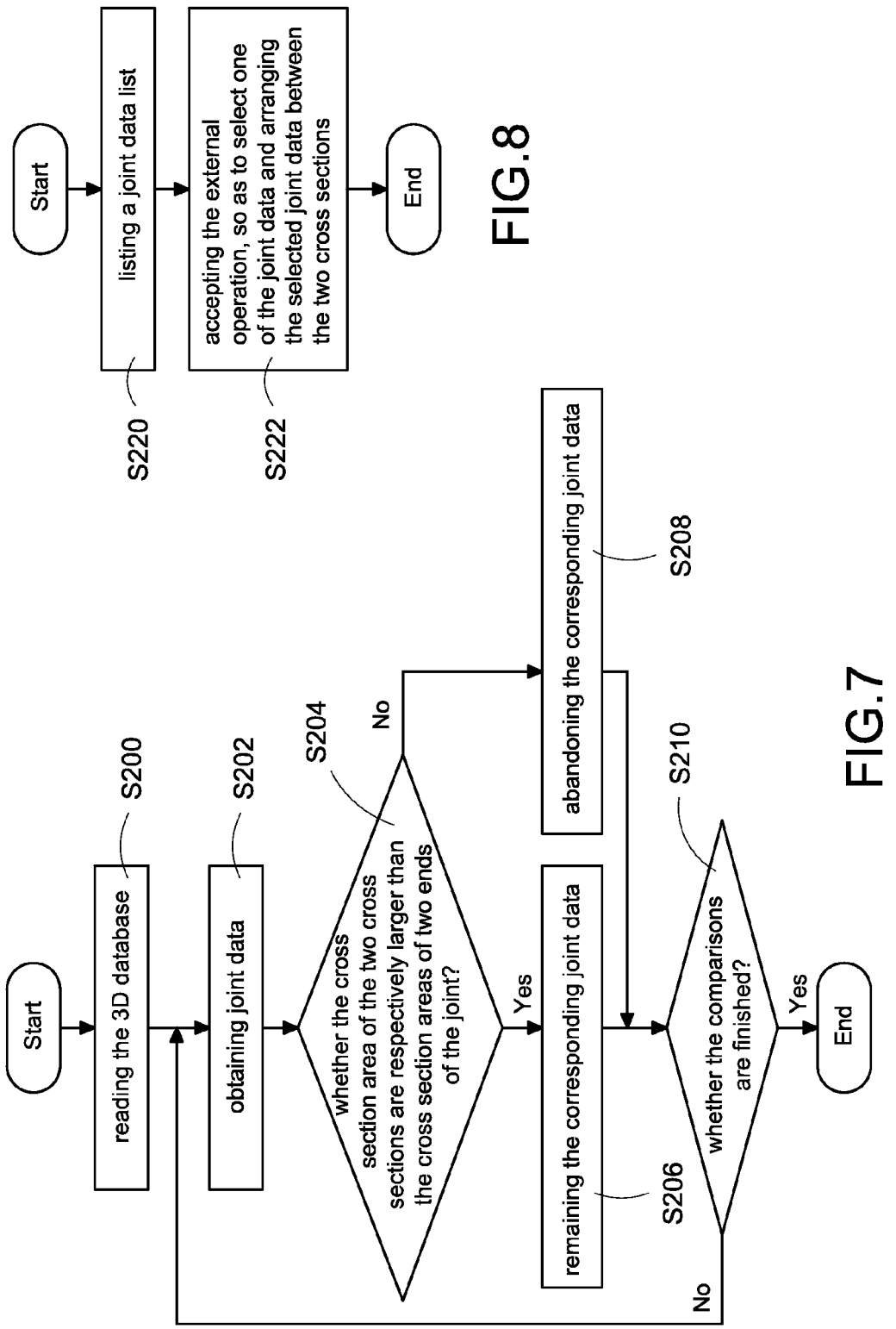

METHOD FOR ARRANGING JOINTS TO 3D MODEL, ARRANGING APPARATUS FOR THE METHOD, AND APPLICATION PROGRAM FOR USING THE SAME

BACKGROUND OF THE INVENTION

1. Technical Field

The technical field relates to a 3D model; in particular, to a method for arranging joints to 3D model, an arranging apparatus for the method, and an application program for using the same.

2. Description of Related Art

In recent years, the 3D printing technology has well developed. Also, the 3D printing technology has been known and used by the public more often because the cost of the 3D printer is reduced.

Generally speaking, the user needs to import a 3D file into a 3D printer, and the 3D printer prints a real and constrain 3D model according to the 3D model recorded in the 3D file. Currently, the real 3D models printed by a 3D printer are mostly fixed and can't move. If we tend to print a real and movable 3D model, the user needs to draw a movable joint at the corresponding position when manufacturing the above 3D model in the 3D file.

However, not every user is equipped with the drawing skill for the 3D model, and usually the user needs to be well trained. Certain users who are not equipped with the drawing skill for the 3D model merely can directly obtain the 3D file via the Internet or from the supplier, and directly import the obtained 3D file into the 3D printer for printing.

From the above, these users can only print the 3D models from the obtained 3D model, but can't further edit the 3D model. In other words, the users can't add one or more joints into the edited 3D model so as to make the printed 3D model movable.

SUMMARY OF THE INVENTION

The disclosures is directed to a method for arranging joints to 3D model, an arranging apparatus for the method, and an application program for using the same, used for automatically finding out positions where allows to arrange a joint on the 3D model, and automatically obtaining and arranging the fitted joint data to a corresponding position.

One of the exemplary embodiments, the method for arranging joints to 3D model comprises steps as follows: obtaining a 3D file; executing a slice process to a 3D model recorded in the 3D file for obtaining a plurality of cross sections; during the slice process, determining if the difference between the two cross-section areas of two adjoined cross sections is larger than a threshold; if the difference between the two cross-section areas of two adjoined cross sections is larger than a threshold, obtaining a corresponding joint data from a 3D database; automatically arranging the joint data into a position between the two cross sections; and outputting the 3D model having arranged joints to a 3D printer after finishing the comparison for all cross sections so as to print a real 3D model, wherein the real 3D model has one or more movable joints.

Comparing with the prior art, via the present disclosure, the user needs not to draw the corresponding joint at each position of the 3D model when drawing for the source file of the 3D file such as a CAD file. Thereby, it can reduce the time consumption when drawing for the mentioned source file.

In addition, certain users do not draw for the mention source file themselves, but obtain the 3D file that can be directly printed from the supplier or via the Internet, such as a STL file. Via the present disclosure, it can automatically arrange the fitted joint data into a proper position when executing a slice process for the 3D model in the 3D file. Thereby, the user needs not to be talented with the drawing skill for the mentioned source file but still can arrange a movable joint into the 3D model that has been edited.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIG. 2E shows a schematic diagram according to a second embodiment of the present one of the exemplary embodiments after a slice process has finished;

FIG. 2F shows a partially magnified drawing of a cross section according to a third embodiment of the present one of the exemplary embodiments;

FIG. 3A shows a schematic diagram according to a first embodiment of the present one of the exemplary embodiments before arranging a joint;

FIG. 3B shows a schematic diagram according to a first embodiment of the present one of the exemplary embodiments after arranging a joint;

FIG. 7 shows a flow chart for comparing joints according to a first embodiment of the present one of the exemplary embodiments; and FIG. 8 shows a flow chart for arranging joints according to a first embodiment of the present one of the exemplary embodiments.

DETAILED DESCRIPTION OF PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. The following description is going to illustrate the method, the electronic device and the computer readable recording media for identifying confidential data provided by the present disclosure with figures; however, it is not restricted by the embodiments below.

One of the exemplary embodiments discloses a method for arranging joints to 3D model, arranging apparatus for the method. In this embodiment, the arranging apparatus may be a computer, an embedded system or a processer, such as the processor of the computer or the 3D printer, and it is no limited thereto. The arranging apparatus has an application, and the application records the program that is executable for the arranging apparatus. After the arranging apparatus executes the application, using the method for arranging joints provided by the present one of the exemplary embodiments, the corresponding technical result would be made.

Figure 1:
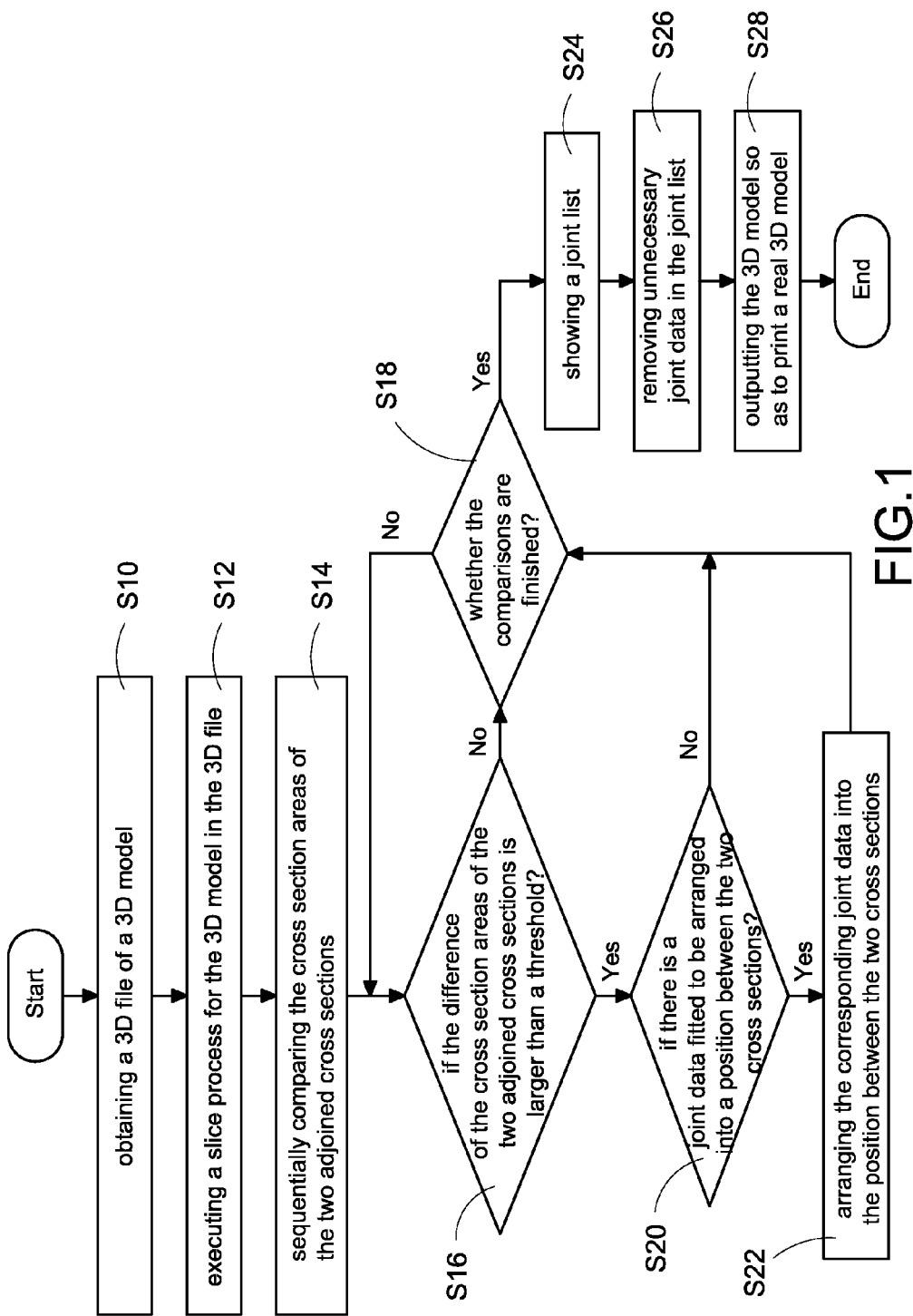
FIG. 1 shows a flow chart of joint arrangement according to a first embodiment of the present one of the exemplary embodiments.
Figure 4:
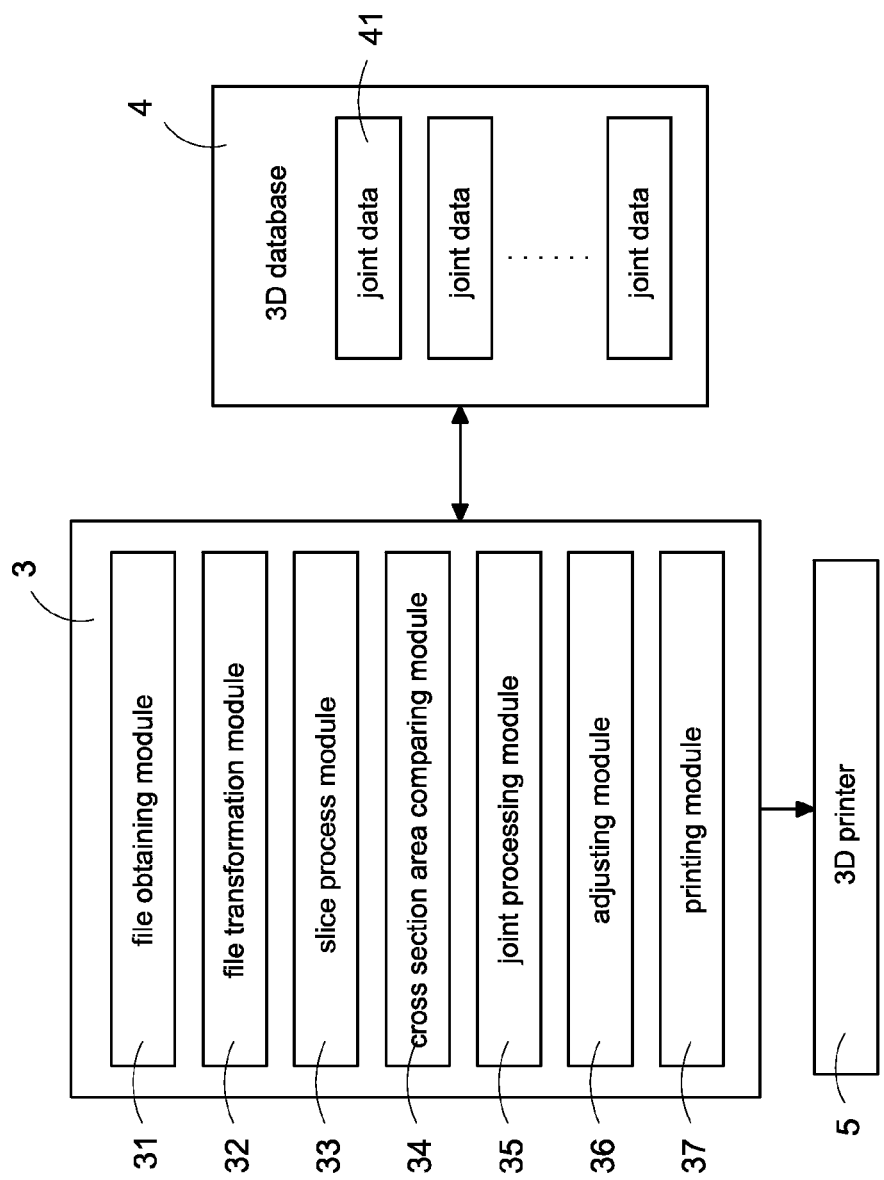
FIG. 4 shows a block diagram of an arranging apparatus according to a first embodiment of the present one of the exemplary embodiments.

Please refer to FIG. 1, FIG. 1 shows a flow chart of joint arrangement according to a first embodiment of the present one of the exemplary embodiments. As shown in FIG. 1, the arranging apparatus (the arranging apparatus 3 as shown in FIG. 4) obtains a 3D file saving a 3D model (Step S10). In this embodiment, the 3D file is a file with an extension ".STL", but it is not limited thereto. The 3D file can be free edited by the user, down loaded via the Internet, transmitted via a carrier (such as a flash, a CD or a memory card), provided by the manufacturer or directly built in the 3D printer, and it is not limited thereto. It is worth mentioning that, if the arranging apparatus 3 obtains a source file of the 3D file first (such as a file with an extension ".CAD"), the arranging apparatus 3 needs to execute a transforming process in advance, so as to transform the source file to the 3D file provided to be printed.

After that, the arranging apparatus 3 executes a slice process for the 3D model (such as the 3D model 1 as shown in the FIG. 2A) in the 3D file, so as to obtain a plurality of cross sections (such as the cross sections 11-17 as shown in FIGS. 2C to 2F) from the 3D model 1 (Step S12). The above mentioned slice process may be Stereolithography (SLA) slice, but it is not limited thereto. The slice process is an often-used skill in this art, and thus the redundant information is not repeated.

During the slice process, the arranging apparatus 3 sequentially compares the cross section areas of the two adjoined cross sections (Step S14), and determines if the difference of the cross section areas of the two adjoined cross sections is larger than a threshold (Step S16). In this embodiment, the threshold is a standard for determining whether a joint is allowed to be arranged. If the difference of the cross section areas of the two adjoined cross sections is larger than a threshold, the arranging apparatus 3 determines that the position between the two cross sections is proper for arranging a corresponding joint.

From the above step S16, if the difference of the cross section areas of the two adjoined cross sections is smaller than a threshold, and the arranging apparatus 3 further determines whether the comparisons between a plurality of cross sections are finished (Step S18). If not yet, it returns back to the step S16 until the comparisons between all the cross sections are finished.

In the step S16, if the difference between the two cross-section areas of two adjoined cross sections is larger than the threshold, the arranging apparatus 3 further determines if there is a joint data fitted to be arranged into a position between the two cross sections (Step S20). If there is no joint data fitted to be arranged into a position between the two cross sections, it turns to the step S18. On the other hand, if there is a joint data fitted to be arranged into a position between the two cross sections, the arranging apparatus 3 arranges the corresponding joint data into the position between the two cross sections (Step S22).

After the corresponding joint data has been arranged, it turns to the step S18, so as to determine whether the comparisons between all cross sections are finished. When the comparisons between all cross sections are finished, the arranging apparatus 3 displays the adjusted 3D model (that is, the 3D model 1 arranged with one or more joint data) via a display unit (not shown).

One of the exemplary embodiments is to determine whether the difference between the two cross-section areas of two adjoined cross sections is larger than the threshold, so as to determine whether to arrange the corresponding joint data into the position. Thus, the arranging apparatus 3 may arrange the joint data into certain positions, which are considered the unnecessary joint data by the user. Therefore, the arranging apparatus 3 further provides a menu to show a joint list (Step S24), wherein the joint list comprises all joint data automatically arranged by the arranging apparatus 3. Also, the menu accepts an external operation by the user so as to remove one or more unnecessary joint data in the joint list (Step S26). After the step S26, the arranging apparatus 3 outputs the 3D model 1 into a 3D printer so as to print a real 3D model (Step S28).

Figure 2B:
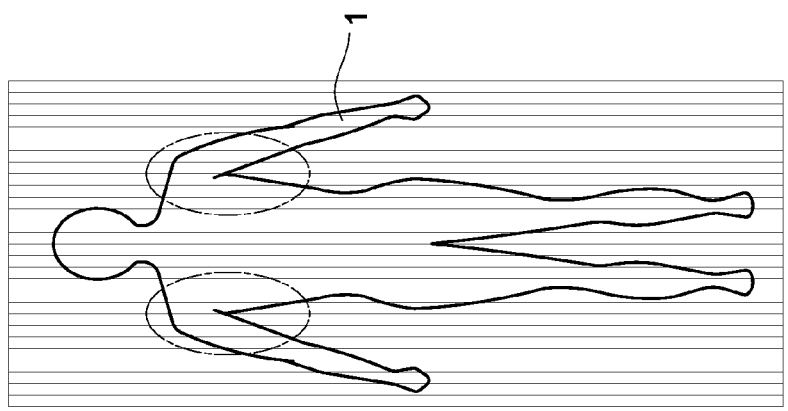
FIG. 2B shows a schematic diagram according to a first embodiment of the present one of the exemplary embodiments after a slice process has finished.
Figure 2A:
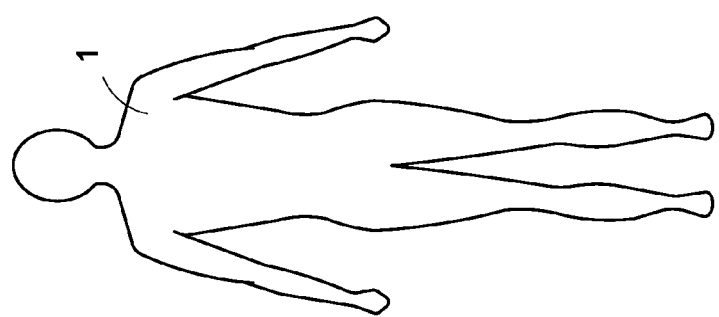
FIG. 2A shows a schematic diagram of a 3D model according to a first embodiment of the present one of the exemplary embodiments.
Figure 2D:
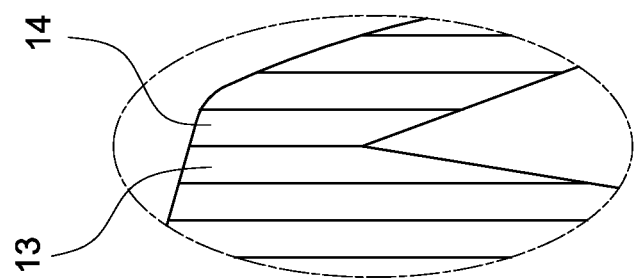
FIG. 2D shows a partially magnified drawing of a cross section according to a second embodiment of the present one of the exemplary embodiments.
Figure 2C:
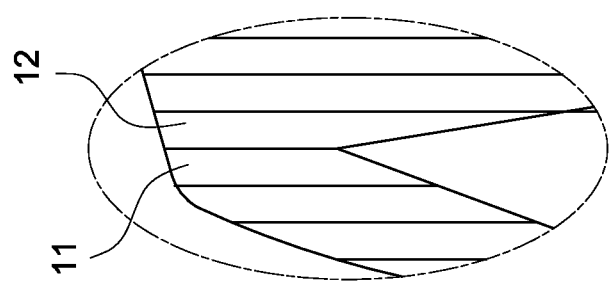
FIG. 2C shows a partially magnified drawing of a cross section according to a first embodiment of the present one of the exemplary embodiments.

Please continue to refer to FIGS. 2A-2F, wherein FIG. 2A shows a schematic diagram of a 3D model according to a first embodiment of the present one of the exemplary embodiments, FIG. 2B shows a schematic diagram according to a first embodiment of the present one of the exemplary embodiments after a slice process has finished, FIG. 2C shows a partially magnified drawing of a cross section according to a first embodiment of the present one of the exemplary embodiments, FIG. 2D shows a partially magnified drawing of a cross section according to a second embodiment of the present one of the exemplary embodiments, FIG. 2E shows a schematic diagram according to a second embodiment of the present one of the exemplary embodiments after a slice process has finished, and FIG. 2F shows a partially magnified drawing of a cross section according to a third embodiment of the present one of the exemplary embodiments.

As shown in FIG. 2A, after the arranging apparatus 3 obtains and opens the 3D file, the 3D model 1 saved in the 3D file would be got. After that, as shown in FIG. 2B. After the arranging apparatus 3 executes a slice process for the 3D model 1, a plurality of cross sections would be got. In the embodiment shown in FIG. 2B, the arranging apparatus 3 mainly executes the slice process for the 3D model 1 from left to right, and obtains the plurality of cross sections.

The arranging apparatus 3 mainly compares the cross section areas of the two adjoined cross sections according to an order used in the slice process. As shown in FIGS. 2C and 2D, it is assumed that the difference of the cross section areas of the adjoined first cross section 11 and second cross section 12 is larger than the threshold, and the difference of the cross section areas of the adjoined third cross section 13 and fourth cross section 14 is larger than the threshold. After the arranging apparatus 3 has finished the slice process, it would automatically obtain the corresponding first joint data (not shown) and automatically arrange the first joint data into a position between the first cross section 11 and the second cross section 12. Also, the arranging apparatus 3 would automatically obtain the corresponding second joint data (not shown) and arrange the second joint data into a position between the third cross section 13 and the fourth cross section 14.

It is worth mentioning that, after determination, if there are a plurality of joint data proper to be arranged into the position between the first cross section 11 and the second cross section 12, the arranging apparatus 3 also can list these joint data to provide to the user. After the user selects the most fitted joint data as the first joint data, the arranging apparatus 3 arranges the selected joint data into the position between the first cross section 11 and the second cross section 12. The above is another embodiment of the present one of the exemplary embodiments, but it is not limited thereto.

Generally speaking, executing the slice process is for the 3D printer to manufacture the real 3D model, and thus merely a one-way slice process needs to be executed (for example, from left to right, as shown in FIG. 2B). However, it may not find all positions for arranging joints on the 3D model merely via a one-way slice process. Therefore, in the present one of the exemplary embodiments, the arranging apparatus 3 can execute the slice process along several directions depending on the user's setting, such as from left to right, from bottom to top, or from front to back, and it is not limited thereto.

In the embodiment shown in FIG. 2E, the arranging apparatus 3 executes the slice process from the bottom to the top of the 3D model, and obtains a plurality of cross sections. To be concrete, as shown in FIG. 2F, it is assumed that the difference of the cross section areas of the adjoined fifth cross section 15 and seventh cross section 17 is larger than the threshold, and the difference of the cross section areas of the adjoined sixth cross section 16 and seventh cross section 17 is larger than the threshold. In this embodiment, after the arranging apparatus 3 has finished the slice process, it would automatically obtain the corresponding third joint data (not shown) and arrange the third joint data into a position between the fifth cross section 15 and the seventh cross section 17. Also, the arranging apparatus 3 would automatically obtain the corresponding fourth joint data (not shown) and arrange the fourth joint data into a position between the sixth cross section 16 and the seventh cross section 17.

Please refer to FIGS. 3A and 3B, FIGS. 3A and 3B respectively show schematic diagrams according to a first embodiment of the present one of the exemplary embodiments before and after arranging a joint. In FIGS. 3A and 3B, the above mentioned first cross section 11 and the second cross section 12 are taken as examples, but it is not limited thereto. In this embodiment, after the above joint data is materialized, the joint 2 shown in FIGS. 3A and 3B would be got.

As shown in FIG. 3A, the joint 2 comprises a first end 21 and a second end 22. When the difference of the cross section areas of the adjoined first cross section 11 and the second cross section 12 is larger than the threshold, and the cross section areas of the first cross section 11 and the second cross section 12 are respectively larger than the cross section areas of the first end 21 and the second end 22 of the joint 2, the arranging apparatus 3 would determine the joint 2 is fitted to be arranged between the cross section 11 and the second cross section 12 and automatically arrange the joint 2 between the first cross section 11 and the second cross section 12. To be concrete, the joint data corresponding to the joint 2 is arranged into the position between the cross section 11 and the second cross section 12.

To be concrete, in this embodiment, the difference of the cross section areas of the first cross section 11 and the second cross section 12 is larger than the threshold, the cross section area of the first cross section 11 is larger than the cross section area of the first end 21 of the joint 2, and the cross section area of the second cross section 12 is larger than the cross section area of the second end of the joint 2. Thus, as shown in FIG. 3B, when the joint 2 is arranged between the first cross section 11 and the second cross section 12, the first end 21 of the joint 2 is connected to the first cross section 11 and the second end 22 of the joint 2 is connected to the second cross section 12.

Please refer to FIG. 4, FIG. 4 shows a block diagram of an arranging apparatus according to a first embodiment of the present one of the exemplary embodiments. As shown in FIG. 4, the arranging apparatus 3 is connect to a 3D database 4 so as to read the 3D database 4 and obtain one or more joint data 41 saved in the 3D database 4, where the joint data 41 respectively records different joints varying in types and sizes. Moreover, the arranging apparatus 3 is further connected to a 3D printer 5, and outputs the 3D model 1 with arrange joints to the 3D printer 5, so as to print a real 3D model.

The arranging apparatus 3 comprises a file obtaining module 31, a file transformation module 32, a slice process module 33, a cross section area comparing module 34, a joint processing module 35, an adjusting module 36 and a printing module 37. These above mentioned modules 31-37 may be hardware modules composed of real devices and may also by software modules with specific functions realized by codes, and it is not limited thereto.

The file obtaining module 31 is configured to obtain and open the 3D file, so as to obtain the 3D model 1 saved in the 3D file. Also, the file obtaining module 31 is configured to obtain the source file of the 3D model 1, and the file transformation module 32 is configured to transform the source file into the 3D file that can be printed. In this embodiment, the source file is a file with an extension ".CAD" and the 3D file is a file with an extension ".STL", but it is not limited thereto.

The slice process module 33 is configured to execute the slice process for the 3D model 1 for one or more times according to the user's setting. If slice process module 33 executes the slice process for the 3D model 1 for several times, each of the slice process would be executed along different direction.

The cross section area comparing module 34 is configured to determine whether there is a position fitted for arranging a joint on the 3D model 1. To be concrete, during the slice process, the cross section area comparing module 34 sequentially compares the cross section areas of two adjoined cross sections, and determines whether the difference of the cross section areas of the two adjoined cross sections is larger than the threshold. If the difference of the cross section areas of the two adjoined cross sections is larger than the threshold, the cross section area comparing module 34 determines that the position between the two adjoined cross sections is fitted to arrange a corresponding joint.

The joint processing module 35 is configured to read the 3D database 4 so as to determine whether there is one or more joint data 41 fitted to be arranged at the above position, and the joint processing module 35 obtains the fitted joint data 41 and arranges it into the above position.

The adjusting module 36 is configured to adjust the 3D model 1 that is arranged with one or more joint data 41, and accept an external operation made by the user via the above menu so as to remove one or more joint data 41 which is unnecessary according to the external operation. The printing module 37 is connected to the external 3D printer 5 for outputting the adjusted 3D model 1 to the 3D printer 5, so that the 3D printer 5 can print according to the 3D model 1 and manufacture the real 3D model.

Figure 5:
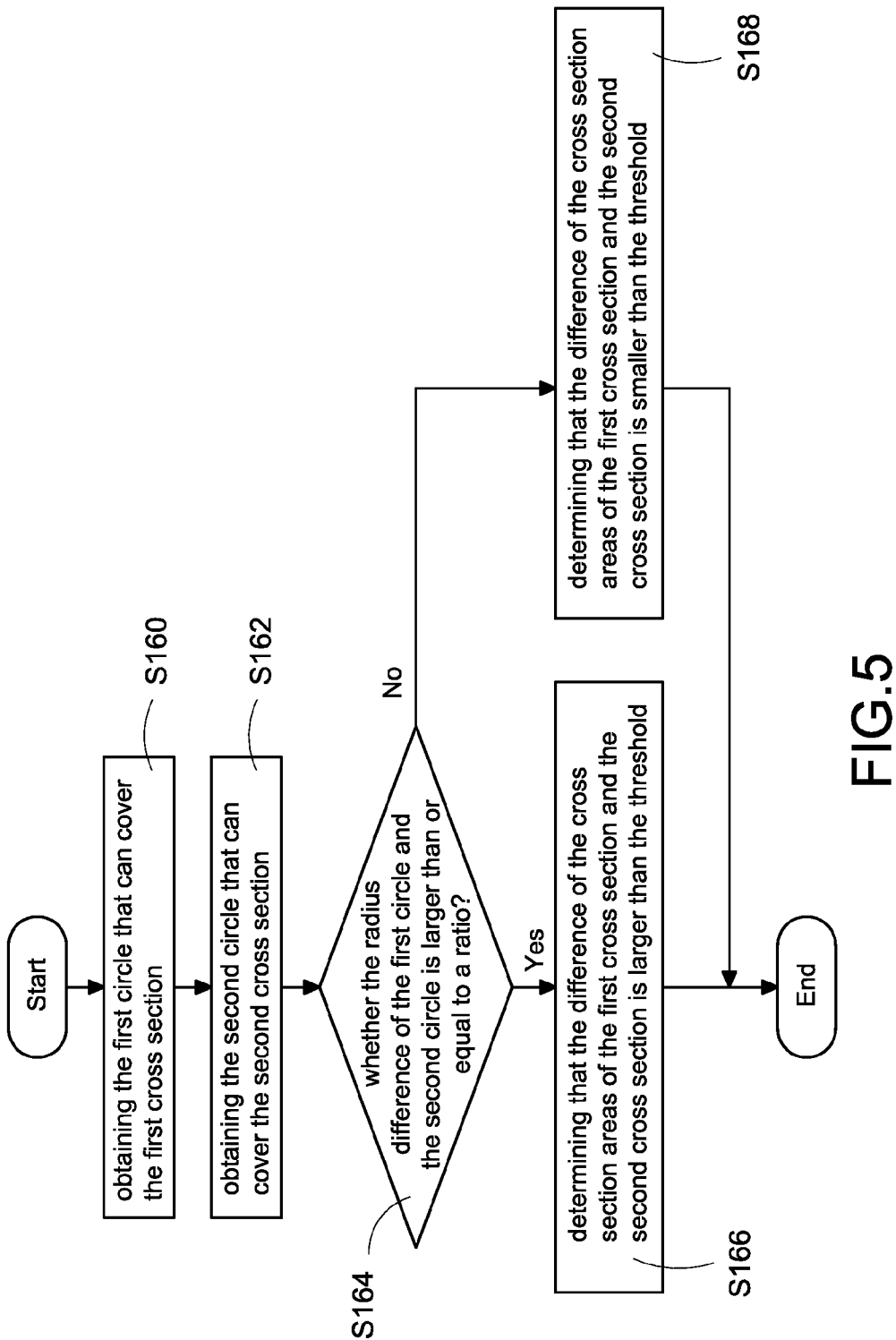
FIG. 5 shows a comparing flow chart of a cross section according to a first embodiment of the present one of the exemplary embodiments.
Figure 6:
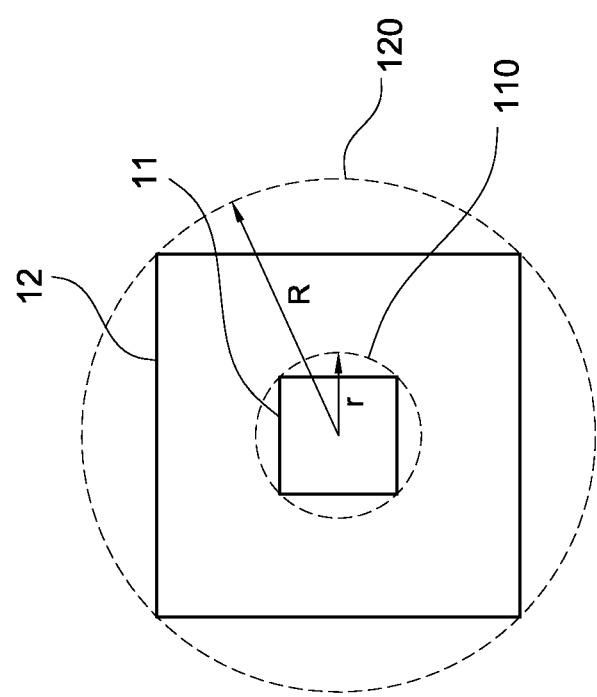
FIG. 6 shows a comparing schematic diagram of a cross section according to a first embodiment of the present one of the exemplary embodiments.

Please refer to FIG. 5, FIG. 5 shows a comparing flow chart of a cross section according to a first embodiment of the present one of the exemplary embodiments. To be specific, each step shown in FIG. 5 is to further define the step S16 shown in FIG. 1. Also, please refer to FIG. 6, FIG. 6 shows a comparing schematic diagram of a cross section according to a first embodiment of the present one of the exemplary embodiments.

When the arranging apparatus 3 compares the two adjoined cross sections (the first cross section 11 and the second cross section 12 are taken as examples), a first circle, the smallest circle that can cover the first cross section 11, is obtained (Step S160). Also, a second circle, the smallest circle that can cover the second cross section 12, is obtained (Step S162). After that, the radius r of the first circle 110 and the radius R of the second circle 120 are compared, and the arranging apparatus 3 determines whether the radius difference of the first circle 110 and the second circle 120 is larger than or equal to a ratio (Step S164). In this embodiment, the preferred ratio is 0.5, but it is not limited thereto.

To be specific, the step S164 is mainly to determine whether the area ratio of the first circle 110 and the second circle 120 is larger than or equal to another ratio (if the ratio is 0.5, another ration may be 0.75). However, the above is merely one embodiment of the present one of the exemplary embodiments, and it is not limited thereto.

After the step S164, if the radius difference of the first circle 110 and the second circle 120 is larger than or equal to the ratio, the arranging apparatus 3 determines that the difference of the cross section areas of the first cross section 11 and the second cross section 12 is larger than the threshold (Step S166). On the other hand, if the radius difference of the first circle 110 and the second circle 120 is smaller than the ratio, the arranging apparatus 3 determines that the difference of the cross section areas of the first cross section 11 and the second cross section 12 is smaller than the threshold (Step S168).

From the above, when comparing the cross section areas, the arranging apparatus 3 would obtain the circles that can completely cover each cross section. It is worth mentioning that, in one preferred embodiment of the present one of the exemplary embodiments, when the arranging apparatus 3 arranges the joint data into the position between two cross sections, it mostly arranges the joint data at the central position of the circle that is relatively small, but it is not limited thereto.

Please refer to FIG. 7, FIG. 7 shows a flow chart for comparing joints according to a first embodiment of the present one of the exemplary embodiments. To be specific, each step shown in FIG. 7 is to further define the step S20 shown in FIG. 1.

As shown in FIG. 7, when the arranging apparatus 3 determines that the position between the two cross sections allows a joint to be arranged, the arranging apparatus 3 reads the 3D database 4 (Step S200). After that, the arranging apparatus 3 obtains one or more joint data 41 from the 3D data base 4 (Step S202). In one embodiment the arranging apparatus 3 reads all joint data 41 in the 3D database 4, and compares each joint data 41 with the two cross sections. However, in another embodiment, the arranging apparatus 3 accepts the user's setting in advance, so as to select the specific joint type (such as hand joint, foot joint, general joint or the like) and to select for the corresponding joint size. In this embodiment, the arranging apparatus 3 merely reads one or more joint data that is satisfied with the user's setting. Thereby, the time consumption for reading and comparing of the arranging apparatus 3 can be effectively saved.

After step S202, after comparing, the arranging apparatus 3 determines whether the cross section area of the two cross sections are respectively larger than the cross section areas of two ends (such as the first end 21 and the second end 22 of the joint 2) of the joint corresponding to the joint data (Step S204). If yes, it means that the joint is fitted to be arranged between the two cross sections and thus the arranging apparatus 3 remains the corresponding joint data 41 (Step S206). If not, it means that the joint is not fitted to be arranged between the two cross sections and thus the arranging apparatus 3 abandons the corresponding joint data 41 (Step S208).

After the step S206 or S208, the arranging apparatus 3 determine whether the comparisons for the joint data 41 are finished (Step S210). If not yet, it turns back to the step S202, so as to obtain the next joint data 41 that is satisfied with the user's setting. If yes, the join comparison is ended. After finishing the steps S200-S210, the arranging apparatus 3 can learn that whether there is the joint data 41 in the 3D database fitted to be arranged into the position between the two cross sections.

Finally, please refer to FIG. 8, FIG. 8 shows a flow chart for arranging joints according to a first embodiment of the present one of the exemplary embodiments. To be specific, each step shown in FIG. 8 is to further define the step S22 shown in FIG. 1.

As described above, after the arranging apparatus 3 has finished the joint comparison, there might be more joint data 41 found to be fitted for arranging between the two cross sections. In this embodiment, the arranging apparatus 3 can also provide another menu (not shown), and the menu would list a joint data list (Step S220). The joint data list comprises one or more joint data 41 fitted to be arranged between the two cross sections, and each joint data 41 respectively records joints that vary in types and sizes.

Via the above menu, the arranging apparatus 3 accepts the external operation of the user, so as to select one of the joint data 41 and arrange the selected joint data 41 between the two cross sections (Step S222).

To sum up, the method and the arranging apparatus 3 provided by the present one of the exemplary embodiments can automatically arrange the fitted joint into a proper position in the 3D model after analysis, so that the user needs not to arrange the joint manually when drawing and manufacturing the 3D model. Thereby, the time consumption of drawing and manufacturing the 3D model can be effectively saved. Also, for the users having different drawing ability for the 3D model, via the present one of the exemplary embodiments, they can arrange joints into the obtained model, which solves the problem which exists for a quite long time.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A method for arranging joints to 3D model, comprising:
    a) executing a slice process to a 3D model recorded in a 3D file for obtaining a plurality of cross sections;
    b) sequentially determining if differences between each two cross-section areas of two adjoined cross sections is larger than a threshold,
    c) if the difference between the two cross-section areas of two adjoined cross sections is larger than the threshold, obtaining a corresponding joint data, and arranging the joint data into a position between the two adjoined cross sections; and
    outputting the 3D model to a 3D printer, so as to produce a real 3D model.

2. The method according to claim 1, wherein in the step a), the slice process to the 3D model process is from left to right.

3. The method according to claim 1, wherein in the step a), the slice process to the 3D model process is from bottom to top.

4. The method according to claim 1, further comprising:
    d) displaying a joint list, wherein the joint list comprises all joint data arranged into the 3D model; and
    e) accepting an external operation, so as to remove the joint data that is unnecessary from the joint list.

5. The method according to claim 1, wherein the step c) comprises:
    c1) if the difference between the two cross-section areas of two adjoined cross sections is larger than the threshold, determining whether there is joint data fitted to be arranged into the position between the two adjoined cross sections; and
    c2) obtaining and arranging the corresponding joint data into the position between the two adjoined cross sections.

6. The method according to claim 5, wherein the step c1) comprise:
    c11) obtaining at least one of the joint data via reading from a 3D database;
    c12) determining if the two cross section areas of the two cross sections are respectively larger than cross section areas of two ends of one joint corresponding to the joint data; and
    c13) if the two cross section areas of the two cross sections are respectively larger than the cross section areas of the two ends of the joint corresponding to the joint data, determining that the joint data is fitted to be arranged into the position between the two adjoined cross sections.

7. The method according to claim 5, wherein the step c2) comprises:
    c21) listing a plurality of joint data that is fitted to be arranged into the position between the two adjoined cross sections, wherein the plurality of joint data respectively records joints that vary in types and sizes;
    c22) accepting an external operation so as to select one of the joint data, and arranging the selected joint data into the position between the two adjoined cross sections.

8. The method according to claim 1, wherein the step b) comprises:
    b1) obtaining a first circle covering the first cross section;
    b2) obtaining a second circle covering the second cross section, wherein the first cross section is adjacent to the second cross section;
    b3) if a radius difference between the first circle and the second circle is larger than or equal to a predetermined ratio, determining a difference of the cross section areas of the first cross section and the second cross section is larger than the threshold.

9. The method according to claim 8, wherein the predetermined ratio is 0.5.

10. An arranging apparatus, comprising:
    a file obtaining module, opening a 3D file so as to obtain a 3D model in the 3D file;
    a slice processing module, executing a slice process to the 3D model for obtaining a plurality of cross sections;
    a cross section area comparing module, sequentially determining if a difference between two cross-section areas of two adjoined cross sections is larger than a threshold, and if the difference between two cross-section areas of two adjoined cross sections is larger than the threshold, determining a position between the two cross sections is fitted to arrange a joint data;
    a joint processing module, obtaining the joint data that is fitted to be arranged between the two cross sections and arranging the joint data in to the position between the two cross sections,
    an adjusting module, adjusting the 3D model arranged with one or more joint data, and removing the joint data that is unnecessary in the one or more joint data according to an external operation; and
    a printing module, connected to a 3D printer, the printing module outputs the adjusted 3D model to the 3D printer, so as to produce a real 3D model.

11. The arranging apparatus according to claim 10, wherein the arranging apparatus is connected to a 3D database and the 3D database stores a plurality of joint data, wherein the plurality of joint data respectively records joints that vary in types and sizes.

* * * * *